(12) United States Patent
Masters

(10) Patent No.: US 7,058,624 B2
(45) Date of Patent: Jun. 6, 2006

(54) SYSTEM AND METHOD FOR OPTIMIZING SEARCH RESULTS

(75) Inventor: Graham S. Masters, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 716 days.

(21) Appl. No.: 09/885,902

(22) Filed: Jun. 20, 2001

(65) Prior Publication Data
US 2002/0198875 A1 Dec. 26, 2002

(51) Int. Cl.
*G06F 17/30* (2006.01)
*G06F 7/00* (2006.01)

(52) U.S. Cl. .................. 707/3; 707/4; 707/10
(58) Field of Classification Search .......... 707/4, 707/3, 1, 10
See application file for complete search history.

(56) References Cited

U.S. PATENT DOCUMENTS

| | | | | |
|---|---|---|---|---|
| 5,742,816 A | * | 4/1998 | Barr et al. ............. | 707/3 |
| 6,012,053 A | | 1/2000 | Pant et al. ............. | 707/3 |
| 6,449,598 B1 | * | 9/2002 | Green et al. ........... | 705/2 |
| 6,633,868 B1 | * | 10/2003 | Min et al. .............. | 707/3 |
| 6,675,159 B1 | * | 1/2004 | Lin et al. .............. | 707/3 |
| 6,738,759 B1 | * | 5/2004 | Wheeler et al. ........ | 707/3 |
| 2001/0049677 A1 | * | 12/2001 | Talib et al. ........... | 707/3 |
| 2002/0138487 A1 | * | 9/2002 | Weiss et al. .......... | 707/10 |
| 2003/0078913 A1 | * | 4/2003 | McGreevy ............. | 707/3 |
| 2003/0088545 A1 | * | 5/2003 | Subramaniam et al. ... | 707/3 |

* cited by examiner

*Primary Examiner*—Greta Robinson
*Assistant Examiner*—Kuen S. Lu

(57) ABSTRACT

A system and method for searching for documents identified in a database, wherein the method comprises the steps of establishing a first search criterion associated with a keyword match between a keyword entry and the identified documents, establishing at least one additional search criterion based on a document attribute of the identified documents, determining a criterion matching score for identified documents for each of the established search criteria, associating a scaling factor with each of the established search criteria, calculating an overall matching score for a selection of the identified documents from the criterion matching scores and scaling factors associated therewith, and ordering the selection of identified documents based upon the calculated overall matching scores.

20 Claims, 6 Drawing Sheets

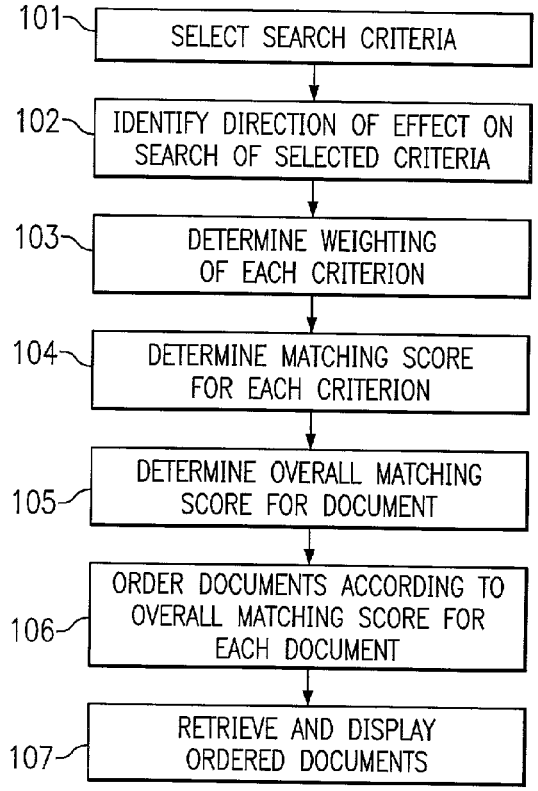
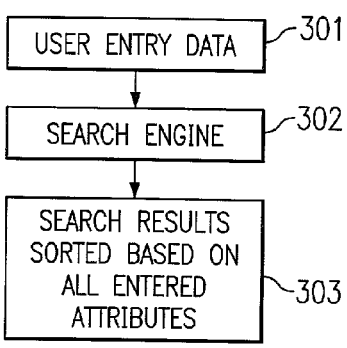
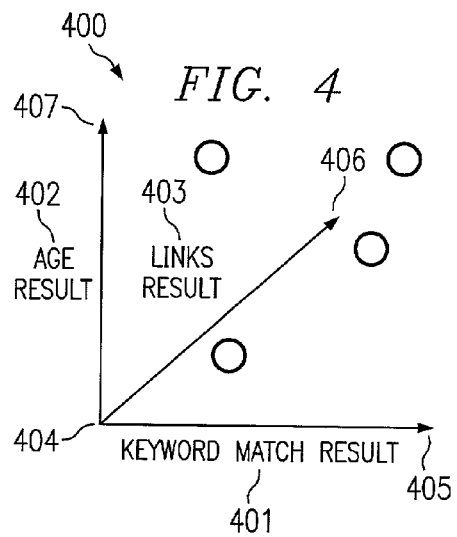
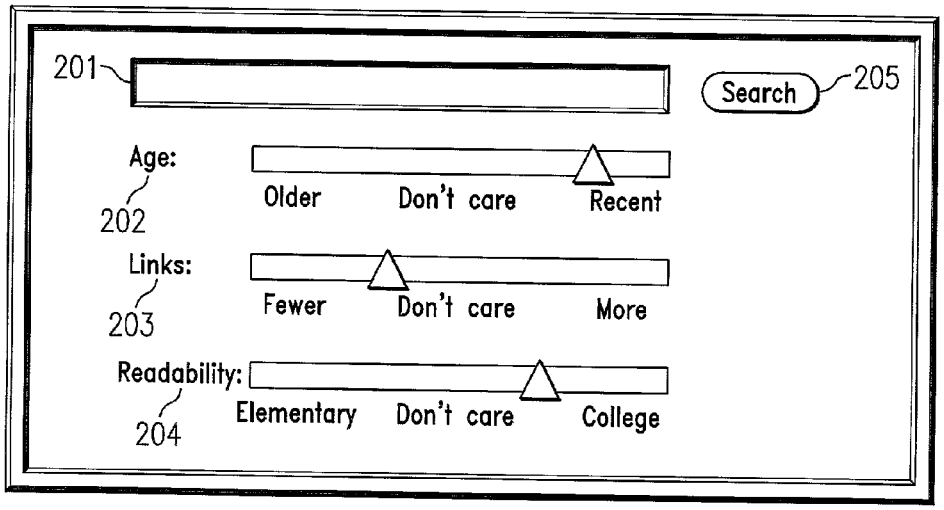

search results

Search String: Your search for AnyWord on *Java issues HP-UX 11.00* provided the following results:
Documents found: 188235
Documents retrieved: 100

Home                                                              511

| Search by Keyword ▼ | Java issues HP-UX 11.00 | (→SEARCH) help |

Search criteria  ○ All Words  ◉ Any Word  ○ Exact Phrase  ○ Boolean

Sort Results by:  ◉ Score  ○ Date  ○ Doc Type  (→SORT)

| score | type | date | size | description |
|---|---|---|---|---|
| 70 | EN | 1999 Sep 30 | 5044 | Java: HP-UX fonts wider than corresponding fonts on SUN and Windows NT |
| 68 | MD | 1997 Dec 23 | 7914 | 11.00 Operating System Release Description |
| 66 | EN | 1998 Jul 24 | 12066 | SWINSTALL: Upgrading HP OV Network Node Manager from HP-UX 10.20 to HP-UX 11.00 |
| 66 | MD | 1998 Jul 24 | 13230 | App Release 8/98 11.00 S700 support Matrix |

*FIG. 5* search results

Search String: Your search for AnyWord on Java issues HP-UX 11.00 provided the following results:
Documents found: 188235
Documents retrieved: 100

Home

| Search by Keyword ▼ | Java issues HP-UX 11.00 | →SEARCH | help |

511

Search criteria  ○ All Words  ⊙ Any Word  ○ Exact Phrase  ○ Boolean
                    501            502              503

Sort Results by:  ○ Score  ⊙ Date  ○ Doc Type  →SORT
                   504      505      506

| score | type | date | size | description |
|-------|------|------|------|-------------|
| 47 | PA | 2000 Nov 22 | 54559 | s700 800 11.00 SCSI IO Subsystem Cumulative Patch |
| 54 | CP | 2000 Nov 21 | 58603 | HP Web Jetadmin 6.2 - Readme File |
| 47 | PA | 2000 Nov 02 | 51602 | s700 800 11.00 LVM Cumulative patch |
| 47 | PA | 2000 Oct 30 | 55317 | s700 800 11.00 SCSI IO Subsystem Cumulative Patch |
| 47 | PA | 2000 Oct 25 | 26792 | s700 800 10.20 OV IT06.0X |

Sort Results by: ○ Score  ● Date  ○ Doc Type  (→ SORT)

| | score | type | date | size | description |
|---|---|---|---|---|---|
| 701 | 47 | PA | 2000 Aug 02 | 38900 | s700_800_10.20_OV_ITO5.3X Consolidated_Server_Patch_A.05.35 |
| 702 | 48 | PA | 2000 Jul 28 | 14144 | s700_800_11.00 EMS(A.03.10) & HA Monitors(A.03.10) patch |
| 703 | 56 | MV | 2000 Jul 27 | 25050 | Internet Explorer/Outlook Express 4.01 for HPUX Readme |
| 704 | 47 | PA | 2000 Jul 26 | 39255 | s700_800_11.00_SCSI_IO Subsystem Cumulative Patch |
| 705 | 52 | SR | 2000 Jul 20 | N/A | Socket read/write performance declines 50% in Java 2 versus JDK 1.1.8.02 |
| 706 | 49 | PA | 2000 Jul 17 | 11362 | s700_800_11.00 Cumulative Mux and Pty patch |
| 707 | 47 | PA | 2000 Jun 19 | 58474 | s700_800_11.00 boot,JFS,PA8600, 3Gdata,NFS,IDS,PM,VM,async |
| 708 | 63 | MD | 2000 May 18 | 36603 | HP-UX Application Software CD Part Number – B3782-10472 |
| 709 | 63 | MD | 2000 May 18 | 36603 | HP-UX Application Software CD Part Number – B3782-10465 |
| 710 | 63 | MD | 2000 May 18 | 35318 | HP-UX Application Software CD Part Number – 24998-12718 |

[First] ≤ 1 2 3 4 5 6 7 8 9 10 ≥ [Last]

*FIG. 7*

| | KEYWORD ONLY SCORE | AGE IN DAYS | NORMALIZED AGE | ADJUSTED RELEVANCE SCORE | DESCRIPTION |
|---|---|---|---|---|---|
| 806 | 70 | 425 | 39.34 | 76.3 | Java: HP-UX fonts wider than corresponding fonts on SUN and Windows NT |
| 807 | 63 | 194 | 17.65 | 75.3 | HP-UX Application Software CD Part Number - 24998-12718 |
| 808 | 63 | 194 | 17.65 | 75.3 | HP-UX Application Software CD Part Number - 24998-12719 |
| 809 | 63 | 194 | 17.65 | 75.3 | HP-UX Application Software CD Part Number - B3782-10464 |
| 810 | 54 | 7 | 0.09 | 73.6 | HP Web Jetadmin 6.2 - Readme Fi |
| 811 | 47 | 6 | 0.00 | 68.6 | s700_800 11.00 SCSI IO Subsystem Cumulative Patch |
| 812 | 68 | 1071 | 100.00 | 68.0 | 11.00 Operating System Release Description |
| 813 | 47 | 26 | 1.88 | 67.9 | s700_800 11.00 LVM Cumulative patch |
| 814 | 47 | 29 | 2.16 | 67.8 | s700_800 10.20 OV IT06.0X Consolidated Server Patch A.06.01 |
| 815 | 66 | 858 | 80.00 | 66.8 | SWINSTALL: Upgrading HP OV Network Node Manager from HP-UX 10.20 to HP-UX 11.00 |
| 816 | 66 | 858 | 80.00 | 66.8 | App Release 8/98 11.00 S700 support Matrix |

FIG. 8

SYSTEM AND METHOD FOR OPTIMIZING SEARCH RESULTS

In the prior art, search engines typically allow a user to enter a search query in the form of one or more keywords. In response to the query, a search engine will generally return a list of ranked results that is ordered by a numeric relevance score. An entry in the result list will typically have a short description, a hyperlink to the identified document, and possibly a numerical score indicating a degree of conformity with the search query. Typically the user is then given the option of reordering the results by an attribute of the document, for example by the date of creation of each document. Such re-ordering is generally executed after a search operation.

One problem with this approach is that users generally want to recover the most relevant and most recent information. Moreover, many users may only examine the first three items within a search results list. When sorting by keyword matches, there is the possibility that the earliest-listed search results may be out of date. And, similarly, when sorting by date, the earliest-listed results may have poor keyword relevance to the topic being searched.

Another document attribute or meta attribute of a web page is the number of incoming links to the web page. The number of incoming links may serve as a useful surrogate for the level of authority likely to be granted to the web page by those recovering the document in a search. The level of importance given to incoming links is usually fixed by the search engine. A potential problem here is that selecting for a high number of links to a web page may operate to favor older pages since such pages generally garner more links as time passes and more pages establish links to the web page at issue.

Accordingly, it is a problem in the art that search engines generally provide a single rigid choice between alternative methods of assigning priority to search results.

It is a further problem in the art that the importance assigned to the number of incoming links to a web page is generally fixed by prior art search engines.

It is a still further problem in the art that optimizing a web search while optimizing for a first characteristic may generate search results in need of further sorting in order to isolate search results satisfying one or more additional characteristics.

SUMMARY OF THE INVENTION

The present invention is directed to a system and method for searching for documents identified in a database, wherein the method comprises the steps of establishing a first search criterion associated with a keyword match between a keyword entry and the identified documents, establishing at least one additional search criterion based on a document attribute of the identified documents, determining a criterion matching score for identified documents for each of the established search criteria, associating a scaling factor with each of the established search criteria, calculating an overall matching score for a selection of the identified documents from the criterion matching scores and scaling factors associated therewith, and ordering the selection of identified documents based upon the calculated overall matching scores.

BRIEF DESCRIPTION OF THE DRAWING

FIG. 1 depicts a sequence of steps for retrieving search results according to a preferred embodiment of the present invention;

FIG. 2 depicts a mechanism for adjusting scaling factors for document attributes according to a preferred embodiment of the present invention;

FIG. 3 depicts data entry to and output from a search engine according to a preferred embodiment of the present invention;

FIG. 4 is a display of search result scores helpful in determining an overall document rank according to a preferred embodiment of the present invention;

FIG. 5 depicts an exemplary search result ordered by keyword matching;

FIG. 6 depicts the earliest listed results of a search ordered by document date;

FIG. 7 depicts later listed results of the same search depicted in FIG. 6;

FIG. 8 depicts a listing of results arising from a search conducted according to a preferred embodiment of the present invention.

DETAILED DESCRIPTION

Figure 9:
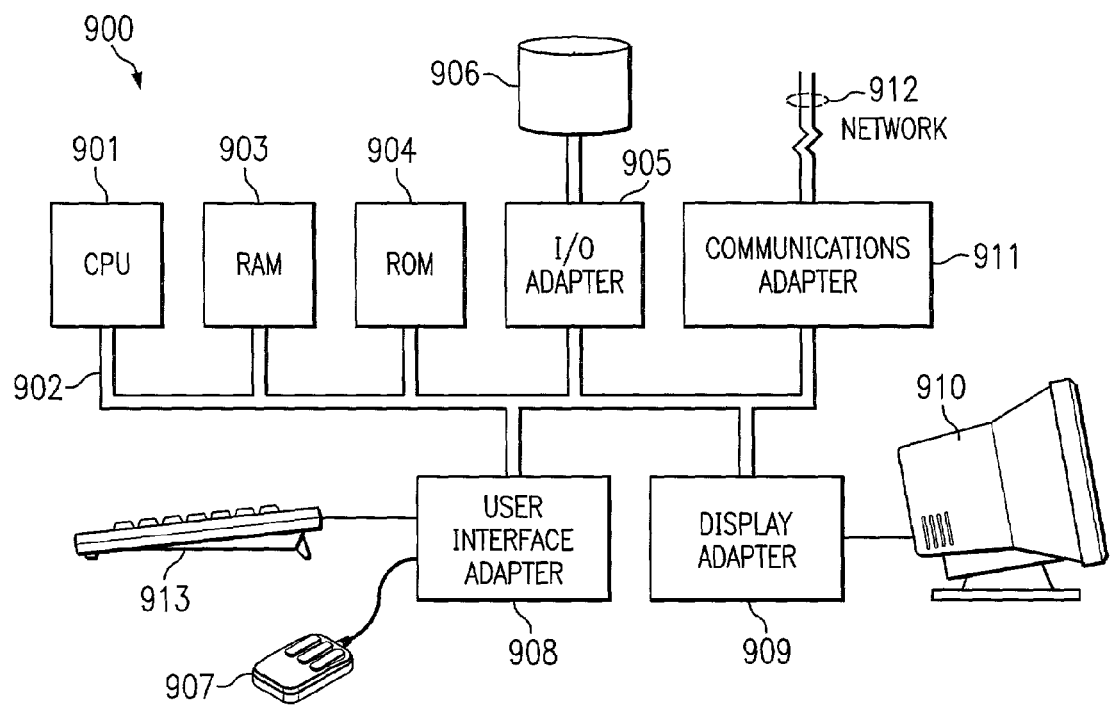
FIG. 9 depicts computer apparatus adaptable for use with a preferred embodiment of the present invention.

The present invention is directed to a system and method which integrates a plurality of meta attributes or document characteristics along with a keyword search result into a search engine document relevance ranking. The inventive approach preferably allows a user to select a plurality of attributes to employ in evaluating documents in a search operation, the direction of the user's preference for each of the attributes (such as, whether the user is searching for older or newer documents), and the relative weight to be accorded each of the selected attributes. An overall rank or matching score is preferably calculated from the individual criterion matching scores generated by appropriately combining such individual criterion matching scores.

Herein, the terms meta data, meta attributes, and document attributes generally correspond to characteristics of a document such as age, number of incoming links, and readability, but generally do not refer to an extent of keyword matching between such document and a keyword search. Herein, the term "search criterion" generally corresponds to a basis for prioritizing a selection of documents from a group of documents, which basis pertains to one of the above-discussed document or meta attributes and/or to an extent to which a document matches a keyword search term. A search criterion relating to a document attribute preferably includes a document attribute query or document attribute search query. A scaling factor may be coupled with such query to indicate a relative weighting of the search criterion with respect to other search criteria forming part of the same search. For example, a search criterion relating to document age could be presented in the following form: 0.5 [Age: more recent], wherein 0.5 is the scaling factor, and the "more recent" is a query indicating a preference for more recent documents.

Alternative document attribute queries may be expressed, such as, for instance, where a readability index varies between 0 and 100, a query could be expressed as [readability {30,50}], indicating that only documents in the range of 30 to 50 will match the query. Additional data may be included in the query to indicate a preference for documents with readability indexes closer to one or another end of a stated range. Of course, one or more such ranges could be specified.

Generally, each search criterion within a search pertains to a different document attribute with one search criterion generally associated with keyword searching (where keyword matching generally does not relate to a document attribute. However, one or more search factors or search variables used in a search may be associated with a single search criterion. For example, a single keyword search criterion could include search factors or search variables for different keywords. A first search factor could include a query for the word "snorkel" and a second search factor could include a query for the word "scuba."

Search criteria for use in the present invention may include but are not limited to the number of word-matches identified for user-identified keywords in a document, the age of the document, the number of links leading to the document, the number of links within the document leading to other documents, the length of the document (as measured in words, sentences, pages, or paragraphs), the number of words per sentence, the number of words per paragraph, the language in which the document is written, and the readability of a document. Herein, the term "readability" or "intellectual grade" of a document generally corresponds to the educational requirement needed to comprehend the contents of such document, such as is measured by certain grammatical analysis programs including but not limited to: the Flesch readability index and the Fox index. Such an attribute may be helpful where a user wishes to find documents on a particular subject for a high school student and wishes to avoid retrieving documents requiring a Master's degree for full comprehension of its contents. Preferably, the readability criterion, where employed, may be employed to screen documents for a range of educational levels. Such readability index is preferably not limited to a one-dimensional measure of intellectual skill. For instance, the readability index could be established to screen for documents according to defined skill levels in different intellectual areas such as, for instance, mathematics, literacy in English, fluency in English or other language, and proficiency in a specialized field such as computer science.

In a preferred embodiment, the inventive approach enables a user to combine the user's search preferences with regard to keyword searching and one or more document attributes in a single search operation, thereby yielding search results which best satisfy the user's preferences. Where, for instance, the user wants documents having a substantial level of recency in addition to exhibiting a good match with user search terms, a result may be generated which provides an effective combination of web page recency and keyword matching rather than presenting a web page having either good keyword matching but which is too old, or a document which is very recent but which has a poor keyword match with the user's search terms. Moreover, users may modify the relative weightings desired for various search criteria in successive searches, if prior searches prove unsatisfactory. For example, where one search retrieves results with sufficient keyword matches but with documents which are too old, the user is preferably able to readily modify the search criteria to increase the value of document recency with respect to the value of keyword matching. A different search result more accurately matching the user's preferences would preferably result.

Therefore, it is an advantage of a preferred embodiment of the present invention that a user may conduct a search for documents which simultaneously takes account of keyword matching and one or more document attributes.

It is a further advantage of a preferred embodiment of the present invention that a user may adjust the relative weighting of various search criteria employed to order the results of a document or web page search.

It is a still further advantage of a preferred embodiment of the present invention that a user may vary the relative weighting of the search criteria in successive searches in order to optimize a search result.

FIG. 1 depicts a sequence of steps for retrieving search results according to a preferred embodiment of the present invention. The succeeding discussion of FIG. 1 presents a general discussion of the operation of the inventive search mechanism. A more detailed treatment of the calculation of matching scores is presented thereafter.

In a preferred embodiment, a user selects search criteria to be employed in searching for documents in step 101. Herein, the documents being searched may be pages on the World Wide Web, but it will be appreciated that other types of electronic documents stored or identified by metadata on a wide range of other databases or storage devices may also be searched employing the mechanism of the present invention, and all such variations are included within the scope of the present invention.

At step 102, a user preferably identifies the direction of the effect on the search result of each selected search criterion. For example, with respect to the "age" criterion, a user could indicate whether younger or older documents are preferred.

Additionally or alternatively to assessing a document's meta data, the algorithms presented herein may be applied to individual search terms or phrases. A user could indicate whether a document should be favored or disfavored based upon the presence of certain words or phrases therein. For example, a search for documents pertaining to a vacation involving snorkeling but not scuba diving could direct the inventive search engine to favor documents including the term "snorkeling" and to disfavor documents including the phrase "scuba diving." The user may specify the weight both of the terms to be favored and those to be disfavored in an ensuing search.

In the prior art, a weight of terms to be favored or included may optionally be specified, but the weight of terms to be disfavored or excluded is generally not available. A limitation arising from the prior art omission of "exclusion-weighting" is that documents that could be considered good search results due to a high number or density of references to a favored term, such as "snorkeling," but which include as little as one reference to a disfavored term, such as "scuba diving," would be completely excluded from a generated search result, thereby denying the searcher a potentially desirable search result document. However, the inventive search engine preferably includes the ability to promote documents including many references to "snorkeling" while simultaneously including the ability to demote to varying degrees but not necessarily completely eliminating, documents including the term "scuba diving." Generally, the degree of promotion or demotion of a document is determined by combining the values of various user search variable selections and the prevalence of identified terms or phrases in documents being evaluated as potential search results.

In a preferred embodiment, overall search results are generally calculated based on a combination of search criterion matching scores associated with keyword matching and with one or more document attributes. Where more than one keyword match query is submitted, an overall keyword matching score is preferably calculated from a combination of matching scores associated with individual keyword queries.

At step 103, the user preferably enters a weighting value, or scaling factor, to be applied to each search criterion by the search mechanism or search engine. Where the age of a document is only moderately important but matching of a keyword term is very important, scaling factors reflecting these respective weightings are preferably applied to matching scores reflecting the extent of a match between each searched document and the user's search criteria. A calculation method for implementing such scaling criteria is presented in detail elsewhere herein. It will be appreciated that such scaling factors may be applied to range of search criteria other than document age and keyword matching.

At step 104, the inventive search engine preferably calculates matching scores for each criterion as applied to each searched document based on the extent to which the document matches such criterion. Such matching scores are preferably combined to calculate an overall document matching score, or overall matching score, for a document.

At step 105, the inventive mechanism preferably generates an overall matching score for each searched document. This is preferably accomplished by multiplying the value of each criterion matching score by its associated scaling factor, squaring the product of each scaling factor-criterion matching score, summing the squares of the scaling factor-criterion matching score products, and taking the square root of this sum to determine the overall matching score for a particular document. This approach is shown in equation 1 below. It will be appreciated that other computational approaches could be employed to generate a single number representing the combined effect of the various scaling factors and criterion matching scores, and all such variations are included within the scope of the present invention.

At step 106, the inventive search engine preferably orders documents according to the overall matching score for each examined document. The documents will be generally be listed in order of descending overall matching score. At step 107, the search engine preferably retrieves and displays the ordered documents for a user.

FIG. 2 depicts a mechanism for adjusting scaling factors for document attributes according to a preferred embodiment of the present invention. This mechanism may be a text box 201 to accept the keyword search and a plurality of user adjustable settings 202–204 for establishing the weighting, as embodied in a scaling factor, of each search criterion. FIG. 2 shows this arrangement for three search criteria, specifically, document age 202, links 203 (which may be incoming or outgoing), and readability 204 (or intellectual grade of the document). However, it will be appreciated that the inventive search engine could enable a user to modify the weightings of any number of document attributes, such as for instance, document length, and all such variations are included within the scope of the present invention.

In a preferred embodiment, a user operates interface 200 by entering keywords into text box 201 and/or adjusting selected ones of settings 202–204 (and/or other document attribute settings) to indicate the relative importance of the document attributes, and clicking the search button 205 to activate a search. In general, the weightings of the various document attributes are established relative to the weighting of the keyword match result whose scaling factor is generally set to a value of 1.

FIG. 3 depicts data entry to and output from search engine 302 according to a preferred embodiment of the present invention. Preferably, user entry data 301 is input to search engine 302 which generates search results 303 which are sorted based on all document attributes as well as keyword match queries included in user entry data 301.

In a preferred embodiment, search engine 302 generates a result list in ranked order determined by an overall matching score calculated according to equation 1, below. The system may optionally store the user's preferences regarding the scaling factors so that upon return to the interface 200, the user does not have to readjust the positions of sliders 202–204.

The following presents a preferred approach for determining the result list ranking. It is assumed that the results for each search criterion are orthogonal (independent of one another) and that the search criteria generate matching scores when applied to a document. These orthogonal matching scores then preferably generate a point in an n-dimensional space. For example, in FIG. 4, there is a three dimensional space 400. Specifically, one dimension is the keyword match score 401, a second dimension is the age score 402, and a third dimension is links score 403.

In a preferred embodiment, points from three dimensional space 400 may then be projected on to a one dimensional result list. It will be appreciated that, based on the number of search criteria entered by a user, space 400 may include fewer or more than three components or dimensions.

A preferred approach to generating a one-dimensional result list is discussed herein. However, other approaches to generation of such a list will be apparent to those of skill in the art. Herein, a criterion matching score is preferably calculated from a criterion matching result and an associated origin offset.

Preferably, the point distance from origin 404 to points 405–407 at the ends of result vectors 402–403, respectively, is the measure of the document relevance (or vector magnitude) for each of the selected criteria. Whether such document relevance operates to favor or disfavor a high ranking of the document generally depends upon the value selected for the origin offset.

Preferably, a vector drawn from origin 404 to any of points 405–407 at the ends of result vectors 401–403, respectively, represents such vector's magnitude. This value is preferably combined with user-entered information to determine an overall matching score for a document. The user-entered information is preferably employed to determine origin offsets and scaling factors for each of the search criteria.

The following steps are preferably performed to calculate the overall rank or overall matching score for a document. First, the matching results for each search criterion are preferably normalized to (or linearly mapped into) a standard range so that the numbers associated with results from each of the search criteria may be meaningfully combined. Herein, the results for each criterion are preferably normalized to the numeric range {0,100}. However, it will be appreciated that any positive numerical range will enable operation of the inventive search engine so long as the numerical ranges are consistent for each user-selected search criterion.

In a preferred embodiment, search results for a search criterion are normalized into a preferred numeric range by finding the highest and lowest numerical results associated with a particular search criterion and scaling the numerical gap between these highest and lowest results to the preferred range, which may be user-selected. For example, where, for a particular search criterion, the lowest returned numerical result is 20 and the highest is 420, the numerical gap between the highest and lowest results is 400. A case where the user desires to use a numeric range of 0–100 is considered. In this instance, scaling a returned result to the 0–100 range would preferably involve subtracting 20 from the returned result (or search criterion matching result) and then dividing the resulting number by 4. In this manner, a result of 20 would yield a normalized result of 0, and a result of 420 would return a normalized result of 100. Thus, in this instance, the normalization offset is 20 and the normalization constant is 4. In this case, a search criterion matching result of 120 would yield a normalized value of (120−20)/4=25. It will be appreciated that in an alternative embodiment, the normalization operation could involve a range of different numerical operations including both linear and/or non-linear computations.

The value of the overall matching score for a particular document may be calculated as follows:

$$r_i = \sqrt{(s_k(k_i+o_k))^2 + (s_a(a_i+o_a))^2 + (s_1(1_1+o_1))^2} \quad \text{(Eq. 1)}$$

wherein:

$r_i$ is preferably the calculated rank (or overall matching score) for the $i^{th}$ document.

$s_k$ is preferably the keyword scaling factor. For the purpose of the instant discussion, the keyword scaling factor is assumed to have a value of "1." However, this scaling factor could be provided with any value in the range {−lowerlimit, 0,+upperlimit}. The optimum values of −lowerlimit and +upperlimit may be determined empirically, however in the preferred embodiment, the range is {−1,0,+1}. Alternatively, other ranges, both symmetric and asymmetric, may be used, such as, for instance, {−1.5,0,+1.5} or {−0.75,0,+1.5}.

$k_i$ is preferably the keyword matching result for the $i_{th}$ document and is preferably in the range {0,100}.

$0_k$ is preferably the keyword origin offset. $0_k$ is preferably set to a value of 0 where multiple occurrences of the pertinent keyword favor a high ranking of the document and is preferably set to −100 when the search favors documents to an increasing degree with diminishing frequency of occurrence of the pertinent search term.

$s_a$ is preferably the age scaling factor and is set to a value in the range {−lowerlimit,0,+upperlimit} as determined by the position of the adjustment setting 202. The optimum values of −lowerlimit and +upperlimit may be determined empirically. However, in a preferred embodiment, the range is {−1,0,+1}. Other ranges, both symmetric and asymmetric, may be used, such as, for instance, {−1.5, 0,+1.5} or {−0.75,0,+1.5}.

When a user selects the "don't care" condition for any of settings 202–204 (FIG. 2), the value of the scaling factor associated with that setting is generally 0. Preferably, the relationship of the adjustment of setting 202 to the value of $s_a$ may be either linear or non-linear. A process of trial and error and/or analysis may be employed to determine an optimum relationship between the position of setting 202 and the value of $s_a$ for the purpose of optimizing the operation of the inventive search engine.

$a_i$ is preferably the age score normalized to the range {0,100}. The age score is preferably determined by measuring the age of the document in a recognized chronological unit (such as days) and normalizing to a range of {0,100} using the following linear mapping function:

$$a_i = \frac{100}{d_{max} - d_{min}}(d_i - d_{min}) \quad \text{(Eq. 2)}$$

where $d_{max}$ is preferably the age of the oldest document, $d_{min}$ is preferably the age of the youngest document, and $d_i$ is preferably the age of a document the attributes of which are currently under evaluation. Generally, the highest score will be awarded to the oldest document. If the user prefers recent documents, the resulting effect on the overall matching score may be modified via adjustment of the value of the age origin offset $o_a$.

$$o_a = \left\{ \begin{array}{c} 0 \\ -100 \end{array} \right\} \quad \text{(Eq. 3)}$$

In a preferred embodiment, the value of $o_a$ is generally 0 where the user prefers older documents and −100 where the user prefers recent documents. It will appreciated that alternative numerical values for $o_a$ may be employed, and that all such variations are included within the scope of the present invention.

In a preferred embodiment, $1_1$ is the link score in the range {0,100}. The link score is preferably determined by counting the number of incoming links to the document and normalizing this count to a number within the range of 0-100 using the following linear mapping function:

$$1_i = \frac{100}{c_{max} - c_{min}}(c_i - c_{min}) \quad \text{(Eq. 4)}$$

In a preferred embodiment, with regard to equation 4 above, $c_{max}$ is the link count for the document with the greatest number of incoming links, $c_{min}$ is the link count for the document with the fewest incoming links, and $c_1$ is the link count of the $i^{th}$ document (the document under consideration). Generally, the highest score will be awarded to documents with the most links. However, if the user prefers documents with fewer links, the resulting effect on the overall matching score may be modified via adjustment of the value of the link origin offset $o_1$.

$$o_1 = \left\{ \begin{array}{c} 0 \\ -100 \end{array} \right\} \quad \text{(Eq. 5)}$$

In a preferred embodiment, the value of $o_1$ is set to 0 for user selections where the user prefers documents with more links and to −100 where the user prefers documents with fewer links. In a preferred embodiment, $s_1$ is the incoming link scaling factor. $s_1$ is preferably set to a value in the range {−lowerlimit,0, upperlimit} as determined by the position of link count adjustment setting 203 (FIG. 2). Generally, the optimum values of −lowerlimit and +upperlimit may be determined empirically. However, a preferred range is {−1, 0,1}. Other ranges both symmetric and asymmetric may be used, such as for instance, {−1.5,0,1.5} or {−0.75,0,1.5}. Where a user selects the "don't care" condition for count adjustment 203, the value of the origin offset is 0. In a preferred embodiment, the relationship of count adjustment setting 203 to the value of $S_k$ may be linear or non-linear.

In a preferred embodiment, the values of $r_i$ for searched documents are evaluated and the documents then ordered according to the $r_i$ values. Generally, the documents are presented in order of descending value of $r_i$.

FIG. 5 depicts an exemplary search result 500 ordered by keyword matching score. In FIG. 5, three options are presented for sorting search results: by score 501, by date 502, and by document type 503. It may be seen that "score" option 501 is selected. In the search result table, columns are provided indicating the score, type, date, and size of each document.

Continuing with the example, it may be seen that under the score column heading 504, the keyword scores of the listed documents begin at 70 for the first document 507, and diminish from there to 68, 66, and then 66 again, for results 507, 508, 509, and 510, respectively. While this approach effectively isolates documents presenting the best keyword matches with the entered keyword 511, the dates of the earliest-listed documents are scattered over a substantial range of time. It is apparent that where a user desires to recover documents with good keyword matching and substantial recency of document creation, effort would generally have to be expended to locate the desired documents within a list of search results.

FIG. 6 depicts the earliest-listed results 600 of a search ordered by document date. It may be seen that in the search results 600 listed in FIG. 6, the date option 502 is selected for sorting the documents. Under the date column heading 506, the results are shown listed in order of increasing age, with the newest document 601 having a date of Nov. 22, 2000. Under the "score" column heading 504, it may be seen that the scores vary with no particular pattern among search results 601–605.

Continuing with the example, and turning to FIG. 7, a set of search results 700 arising from the same search associated with FIG. 6 is presented. It may be seen that results 708–710 have fairly high keyword scores of 63 and dates of May 18, 2000, thereby presenting an effective combination of document recency and keyword matching. However, the results listed in FIG. 7 represent the third page of the search results for which the first page is shown in FIG. 6. A user would generally have to manually look through a substantial number of search results, employing the search mechanism depicted in FIGS. 6 and 7, in order to find desirable results 708–710, thereby expending valuable time and effort.

FIG. 8 depicts a listing of results 800 arising from a search conducted according to a preferred embodiment of the present invention. Column headings 801–805 point out keyword score, age in days, normalized age, adjusted relevance score, and document description respectively.

The results in FIG. 8 are ordered according to descending value of adjusted relevance score 804 according a preferred embodiment of the present invention. Adjusted relevance score 804 generally corresponds to the term "overall matching score" employed elsewhere herein. The adjusted relevance score 804 is calculated according to algorithms presented elsewhere herein in connection with the overall matching score, to effectively combine the recency and the extent of the keyword match for each document. In this manner, the documents having the best combination of recency and keyword matching, according to user-supplied relative weighting of the two criteria, are presented at the top of the list instead of being randomly scattered throughout several pages of results.

The consequence of combining the effects of keyword matching and document recency may be seen by examining documents 812 and 813. Document 812 has a relatively high keyword score of 68 and a low level of recency, being 1071 days old. Document 813 has a relatively low keyword score of 47 and relatively high recency level, being only 26 days old. The adjusted relevance scores of the documents 812 and 813 are however quite close, at 68.0 and 67.9, respectively.

FIG. 9 illustrates computer system 900 adaptable for use with a preferred embodiment of the present invention. Central processing unit (CPU) 901 is coupled to system bus 902. CPU 901 may be any general purpose CPU, such as a Hewlett Packard PA-8200. However, the present invention is not restricted by the architecture of CPU 901 as long as CPU 901 supports the inventive operations as described herein. Bus 902 is coupled to random access memory (RAM) 903, which may be SRAM, DRAM, or SDRAM. ROM 904 is also coupled to bus 902, which may be PROM, EPROM, or EEPROM. RAM 903 and ROM 904 hold user and system data and programs as is well known in the art.

Bus 902 is also coupled to input/output (I/O) adapter 905, communications adapter card 911, user interface adapter 908, and display adapter 909. The I/O adapter 905 connects to storage devices 906, such as one or more of hard drive, CD drive, floppy disk drive, tape drive, to computer system 900. Communications adapter 911 is adapted to couple computer system 900 to network 912, which may be one or more of local area network (LAN), wide-area network (WAN), Ethernet or Internet network. User interface adapter 908 couples user input devices, such as keyboard 913 and pointing device 907, to computer system 900. Display adapter 909 is driven by CPU 901 to control the display on display device 910.

In a preferred embodiment, user interface 200 is presented on display device 910. Information for entry into user interface 200 may be provided by one or more of keyboard 913 and pointing device 907. Preferably, CPU 901 is employed to calculate various matching scores discussed elsewhere herein. It will be appreciated that computer systems having configurations and components differing from that of computer system 900 may be employed in conjunction with the present invention, and all such variations are included within the scope of the present invention.

What is claimed is:

1. A method for searching for documents identified in a database, the method comprising the steps of:

establishing a first search criterion associated with a keyword match between a keyword entry and said identified documents;

establishing at least one additional search criterion based on a document attribute of said identified documents;

determining a criterion matching score for said identified documents for each of said established search criteria;

associating a scaling factor with each of said established search criteria;

calculating an overall matching score for selected ones of said identified documents from said determined criterion matching scores and said associated scaling factors; and ordering said selected ones of said identified documents based upon said calculated overall matching scores.

2. The method of claim 1 wherein said database is accessible from a web site and said identified documents are web pages.

3. The method of claim 2 wherein said step of establishing at least one additional search criterion comprises the step of:

establishing a search criterion based on a creation date of said identified documents.

4. The method of claim 2 wherein said step of establishing at least one additional search criterion comprises the step of:

establishing a search criterion based on a number of incoming links to said identified documents.

5. The method of claim 2 wherein said step of establishing at least one additional search criterion comprises the step of:
establishing a search criterion based on a readability of said identified documents.

6. The method of claim 2 wherein said associating step comprises the step of:
adjusting a scaling factor for at least one of said established search criteria.

7. The method of claim 6 further comprising the step of:
modifying said adjusted scaling factor in at least two successive searching operations.

8. The method of claim 6 wherein said adjusting step comprises the step of:
manually adjusting said scaling factor.

9. The method of claim 6 wherein said adjusting step comprises the step of:
automatically adjusting said scaling factor.

10. The method of claim 6 further comprising the step of:
selecting a numerical range for a criterion matching result of at least one of said established search criteria.

11. The method of claim 10 wherein said determining step comprises the steps of:
mapping said criterion matching result into said selected numerical range;
selecting an origin offset associated with said mapped criterion matching result; and
adding said mapped criterion matching result and said selected origin offset.

12. The method of claim 2 wherein said calculating step comprises the steps of:
multiplying each said determined criterion matching score by its associated scaling factor;
squaring each said multiplied determined criterion matching score;
summing said squared multiplied determined criterion matching scores; and
determining a square root of said summed squared multiplied determined criterion matching scores.

13. A search engine for recovering documents, the search engine comprising:
an interface for receiving search criteria defining at least one keyword query and at least one document attribute query, wherein said interface receives exclusion-weighting criteria; and
an adjustment setting for adjusting a weighting of a search criterion of said search criteria based on said exclusion-weighting criteria defining said at least one document attribute query.

14. The search engine of claim 13 wherein said search engine operates in conjunction with a world wide web browser and said documents are web pages.

15. The search engine of claim 13 further comprising:
a document rank calculator for determining a rank of a document of said documents based on said adjusted weighting of said search criterion defining said at least one document attribute query.

16. The search engine of claim 13 further comprising:
a normalization algorithm for mapping a naturally occurring numeric range of results returned for said search criterion defining said at least one document attribute query into a user-defined range.

17. A system for searching for web pages on the Internet, the system comprising:
means for establishing at least one document attribute search query;
means for adjusting an importance of said at least one established document attribute search query relative to a keyword match query;
means for calculating a search result rank for said web pages based on said adjusted importance;
means for recovering web pages from the Internet based on said calculated web page search result rank; and
means for ordering said recovered web pages in order of decreasing value of said established web page search result rank.

18. The system of claim 17 wherein said at least one document attribute search query comprises:
a search query directed to a creation date of a web page of said web pages.

19. The system of claim 17 wherein said adjusting means comprises:
means for generating a scaling factor proportional to said adjusted importance of said at least one document attribute search query.

20. The system of claim 19 wherein said generating means comprises: a user-data input mechanism.

* * * * *